United States Patent

Miki et al.

[11] Patent Number: 6,094,515
[45] Date of Patent: Jul. 25, 2000

[54] OPTICAL MODULE

[75] Inventors: Atsushi Miki; Norimasa Kushida, both of Yokohama, Japan

[73] Assignee: Sumitomo Electric Industries, Ltd., Osaka, Japan

[21] Appl. No.: 09/060,326

[22] Filed: Apr. 15, 1998

[30] Foreign Application Priority Data

Apr. 15, 1997 [JP] Japan .................................. 9-097541

[51] Int. Cl.⁷ .................................................. G02B 6/36
[52] U.S. Cl. .................................. 385/31; 385/93; 385/43
[58] Field of Search ............................... 385/33, 34, 38, 385/35, 93, 43, 31

[56] References Cited

U.S. PATENT DOCUMENTS

| | | | |
|---|---|---|---|
| 4,243,399 | 1/1981 | Khoe et al. | 65/4 B |
| 4,269,648 | 5/1981 | Dakss et al. | 350/96.18 |
| 4,737,004 | 4/1988 | Amitay et al. | 350/96.15 |
| 5,600,744 | 2/1997 | Takahashi | 385/38 |

FOREIGN PATENT DOCUMENTS

| | | | |
|---|---|---|---|
| 766107A1 | 4/1997 | European Pat. Off. . | |
| 3617799 | 12/1987 | Germany | 385/33 |

OTHER PUBLICATIONS

Weidel, E., "Light Coupling From A Junction Laser Into A Monomode Fibre With A Glass Cylindrical Lens On The Fibre End", Optical Communications, vol. 12, No. 1, Sep. 1974, pp. 93–97.

Modavis, et al., "Anamorphic Microlens for Laser Diode to Single–Mode Fiber Coupling", IEEE Photonics Technology Letters, vol. 7, No. 7, Jul. 1995, pp. 798–800.

*Primary Examiner*—Hung N. Ngo
*Attorney, Agent, or Firm*—Pillsbury Madison & Sutro LLP

[57] ABSTRACT

An optical module comprises a semiconductor light-emitting device having a near-field pattern elongated in a transverse direction, and an optical fiber having a light incident face which converges light intensity distribution along a longitudinal direction more than that along the transverse direction. Preferably, the semiconductor light-emitting device is a semiconductor laser. Emitted light having a transversely elongated near-field pattern would have a longitudinally elongated far-field pattern. As the optical fiber converges the light intensity distribution along the longitudinal direction more than that along the transverse direction, the light incident thereon can be converged into its core at a high coupling efficiency.

13 Claims, 5 Drawing Sheets

OPTICAL MODULE

BACKGROUND OF THE INVENTION

1. Field of the Invention

The present invention relates to an optical module for coupling light emitted from a light-emitting device such as semiconductor laser or light-emitting diode with an optical fiber.

2. Related Background Art

A conventional optical module, which comprises a semiconductor laser and an optical fiber whose tip portion is provided with a lens for coupling with light emitted from the semiconductor laser, is disclosed in *IEEE PHOTONICS TECHNOLOGY LETTERS*, Vol. 7, No. 7, pp. 798–800, 1995. According to this literature, the anamorphic fiber microlens is evaluated for coupling between laser diodes and single-mode fibers.

SUMMARY OF THE INVENTION

It is an object of the present invention to provide an optical module equipped with a coupling structure which can couple emitted light with an optical fiber at a high coupling efficiency even when the emitted light has an elliptic emission pattern.

The optical module in accordance with the present invention comprises a semiconductor light-emitting device having a near-field pattern elongated along a transverse direction, and an optical fiber having a light incident face which converges light intensity distribution along a longitudinal direction more than that along the transverse direction. Preferably, the semiconductor light-emitting device is a semiconductor laser. Emitted light having a transversely elongated near-field pattern would have a longitudinally elongated far-field pattern. As the optical fiber converges the light intensity distribution along the longitudinal direction more than that along the transverse direction, the light incident thereon can be converged into its core at a high coupling efficiency.

In the case where the optical module is configured such that the light emitted from the semiconductor light-emitting device is converged by a condenser lens to couple to the light incident face of the optical fiber, while an incident elliptical light is corrected to a circular form at the incident face, a wider range of tolerance in mechanical precision can be obtained, and optical coupling efficiency can further be improved.

When a collimator lens is disposed between the light exit face of the semiconductor light-emitting device and the condenser lens, the position where coupling efficiency is less likely to be influenced by positional deviation between the light-emitting device and the light incident face of the optical fiber. Also, as a consequence of such effects, the optical module is further effective in improving mass productivity, mechanical strength, degree of freedom in design, and the like. It is preferable that the core of the optical fiber expands toward said incident face.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, optical modules in accordance with embodiments will be explained. Constituents identical to each other or those having functions identical to each other will be referred to with numerals or letters identical to each other without their overlapping explanations repeated.

The embodiments of the optical module in accordance with the present invention will be explained hereinafter with reference to the drawings.

The light emitted from an edge-emission type semiconductor laser or a light-emitting diode of the same type diverges with an angle caused by diffraction at the light-emitting end face thereof, whereby its emission pattern (near-field pattern or far-field pattern) is not truly circular but elliptical. Namely, in the emitted light, the divergent angle $\theta_s$ in the vertical direction (or horizontal direction) differs from the divergent angle $\theta_p$ in the horizontal direction (or vertical direction). When the emitted light having such an elliptical emission pattern is directly coupled with an optical fiber having a circular incident face, high coupling efficiency cannot be obtained due to mismatching in mode diameter.

Figure 1A:
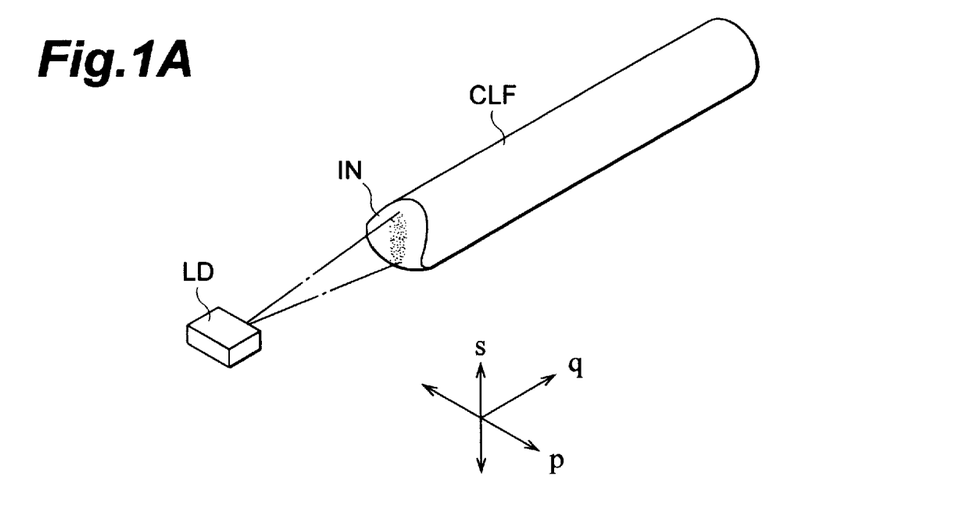
FIG. 1A is an explanatory view schematically showing a configuration of the optical module in accordance with the first embodiment.

Therefore, as schematically shown in FIG. 1A, the optical module in accordance with the first embodiment employs an optical fiber having an light incident face IN which is processed into a convex surface centered about its core along only one direction (vertical direction s in the drawing) CLF (hereinafter referred to as cylindrical-lens-equipped optical fiber), whereby the direction yielding a large divergent angle in the light emitted from the light-emitting device LD (vertical direction s) and the direction of the convex surface of the incident face IN coincide with each other. Namely, this optical module comprises the semiconductor light-emitting device LD having a near-field pattern elongated in a transverse direction, and the optical fiber CLF having the light incident face IN for converging the light intensity distribution along a longitudinal direction more than that along the transverse direction. Preferably, the semiconductor light-emitting device LD is a semiconductor laser. The emitted light having a transversely elongated near-field pattern yields a longitudinally elongated far-field pattern. Since the optical fiber converges the light along the longitudinal direction more than that along the transverse direction, the light incident on the optical fiber can be converged into its core at a high coupling efficiency. Also, in this configuration, since the elliptical light emitted from the light-emitting device LD is changed into a circular light at the incident face IN and then enters the inside thereof, coupling efficiency is improved. Here, it is assumed that the transverse direction is a direction perpendicular to both the thickness direction and light-emitting direction of the semiconductor laser LD, and that the longitudinal direction is a direction in parallel to the thickness direction of the semiconductor laser LD.

In the optical module shown in FIG. 1A, in order to couple the light exit face of the light-emitting device LD and the incident face IN of the cylindrical-lens-equipped optical fiber CLF with each other, it is necessary to be designed beforehand to yield a very high assembling precision.

Figure 1B:
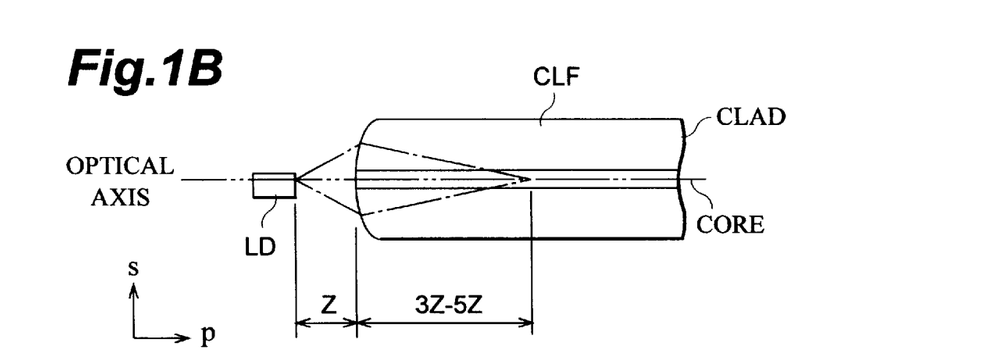
FIG. 1B is an explanatory view schematically showing a configuration of the optical module in accordance with the first embodiment.
Figure 1C:
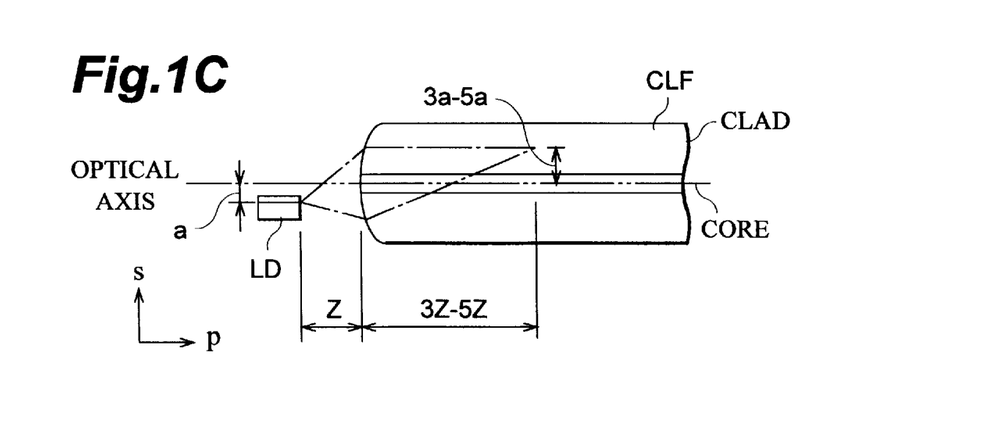
FIG. 1C is an explanatory view schematically showing a configuration of the optical module in accordance with the first embodiment.

As shown in the vertical sectional view of FIG. 1B, the convex surface is assumed to be formed such that the distance between the light exit face of the light-emitting device LD and the center (apex portion of the convex surface) of a core CORE of the incident face IN of the optical fiber CLF is Z, and that the focal length f of the incident face IN is within the range of 3Z to 5Z in order to reduce loss in the light incident on the optical fiber CLF. In other words, assuming that the near-field diameter of the light emitted from the light-emitting device LD is $r_1$ and that the mode-field diameter of the optical fiber CLF is $r_2$, the incident face IN is formed into a convex surface such that their ratio ($r_2/r_1$) is within the range of 3 to 5. In the actual assembling process or the like, as shown in FIG. 1C, when positional deviation occurs between the light-emitting device LD and the optical fiber CLF such that the amount of deviation between the center of the light exit face of the light-emitting device LD and the center of the mode-field diameter $r_2$ in the optical fiber CLF in the vertical direction s becomes a, the position where the light incident on the incident face IN converges apparently shifts from the center of core CORE by a distance of 3a to 5a in its radial direction. Note that core CORE is buried in a cladding CLAD of optical fiber CLF and is aligned with the optical axis. Thus, when the assembling precision is low, coupling efficiency cannot be further enhanced.

Also, in order to minimize the shifting of the converging position (focal position) of the light, it is necessary for the light exit face of the light-emitting device LD and the incident face IN of the optical fiber CLF to be placed very close to each other, thereby requiring a very high positional precision.

Therefore, in the optical module in accordance with the next embodiment, its configuration is arranged such that coupling efficiency can be enhanced even when the positional precision is not very high.

Figure 2A:
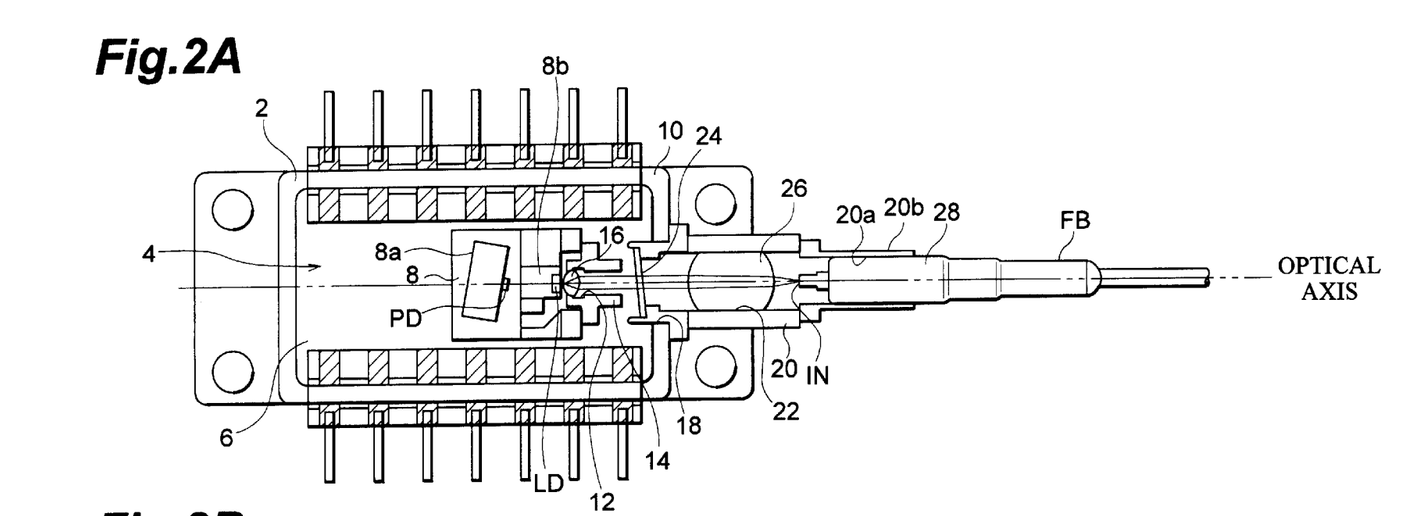
FIG. 2A is a view showing a horizontal sectional configuration of the optical module in accordance with the second embodiment.
Figure 2B:
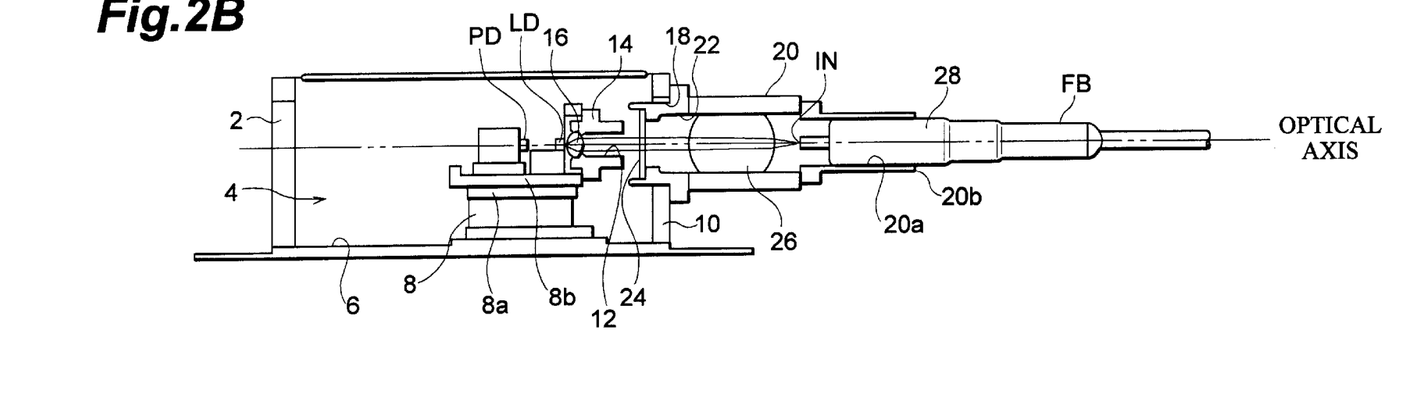
FIG. 2B is a view showing a vertical sectional configuration of the optical module in accordance with the second embodiment of the present invention.

FIG. 2A is a horizontal sectional view for showing the inner configuration of this optical module, whereas FIG. 2B is a vertical sectional view for similarly showing the inner configuration of this optical module. Each of these drawings shows the optical module cut along a section including the optical axis of optical parts which will be explained later.

In FIG. 2A and FIG. 2B, the optical module is configured such that various kinds of optical parts, which will be explained later, are accommodated and secured in a cavity 4 of a housing 2 formed by metal molding or the like, the inside of the housing 2 is sealed, and an optical fiber FB to become a so-called pigtail is connected to one side wall of the housing 2, thereby yielding a module structure.

A temperature-controlled Peltier device 8 is secured to a bottom wall 6 within the cavity 4. To the upper end of the Peltier device 8, a monitoring light-receiving device PD such as photodiode is secured on a sub-mount 8a; and a light-emitting device LD such as edge-emission type semiconductor laser or light-emitting diode secured is also on the sub-mount 8b. The light exit face of the light-emitting device LD is directed to a predetermined side wall 10 of the housing 2, whereas the light-receiving face of the light-receiving device PD is directed to the light-emitting device LD. A plurality of lead terminals integrally formed with the housing 2, the light-emitting device LD, the light-receiving device PD, and the Peltier device 8 are connected to each other by bonding wires or the like.

A lens holder 14 having a circular through hole 12 corresponding to the light exit face of the light-emitting device LD is secured to the upper end of the sub-mount 8a, whereas a collimator lens 16 is fitted into the through hole 12. The form of the lens holder 14 is predefined at its designing step. In the assembling process, as the lens holder 14 is firmly attached to a predetermined upper end of the sub-mount 8a, and the collimator lens 16 is mounted; the collimator lens 16 and the light exit face of the light-emitting device LD are disposed close to each other, and they are aligned with each other in terms of optical axis.

The side wall 10 of the housing 2 is formed with a through hole 18 corresponding to the through hole 12 of the lens holder 14. A tubular lens holder 20 is mounted into the through hole 18 from the outside. The lens holder 20 is formed beforehand with a through hole 22 aligning with the optical axis of the light-emitting device LD and collimator lens 16. Secured to the tip portion of the lens holder 20 by hermetic seal is a transparent thin plate 24 made of glass, sapphire, or the like blocking the through hole 22 to tightly seal the inside of the cavity 4. A condenser lens 26 is assembled in the through hole 22.

The position and form of the through hole 18 in the side wall 10 and the form of the lens holder 20 are predefined at their designing steps. In the assembling process, as the lens holder 20 is inserted into the through hole 18 and is firmly attached thereto by YAG welding or the like, and the transparent thin plate 24 and the condenser lens 26 are assembled, the condenser lens 26, the light-emitting device LD and the collimator lens 16 are aligned with each other in terms of optical axis. The lens holder 20 comprises a cylindrical member fitted into the through hole 18 of the side wall 10, and a cylindrical member in which the condenser lens 26 is inserted and secured. As these cylindrical members are connected to each other by YAG welding or the like, they are united together.

To a rear end portion of the through hole 22 in the lens holder 20, a sleeve 20b having a through hole 20a communicating with the through hole 22 is firmly attached by YAG welding or the like. Inserted into the through hole 20a is a tip portion of a ferrule 28 in which an optical fiber FB is inserted and secured. The forms of the sleeve 20*b* and ferrule 28 are also predefined at their designing steps such that, when the ferrule 28 is inserted into the through hole 20*a* in the assembling process, the light incident face IN of the optical fiber FB coincides with the optical axis.

Figure 3:
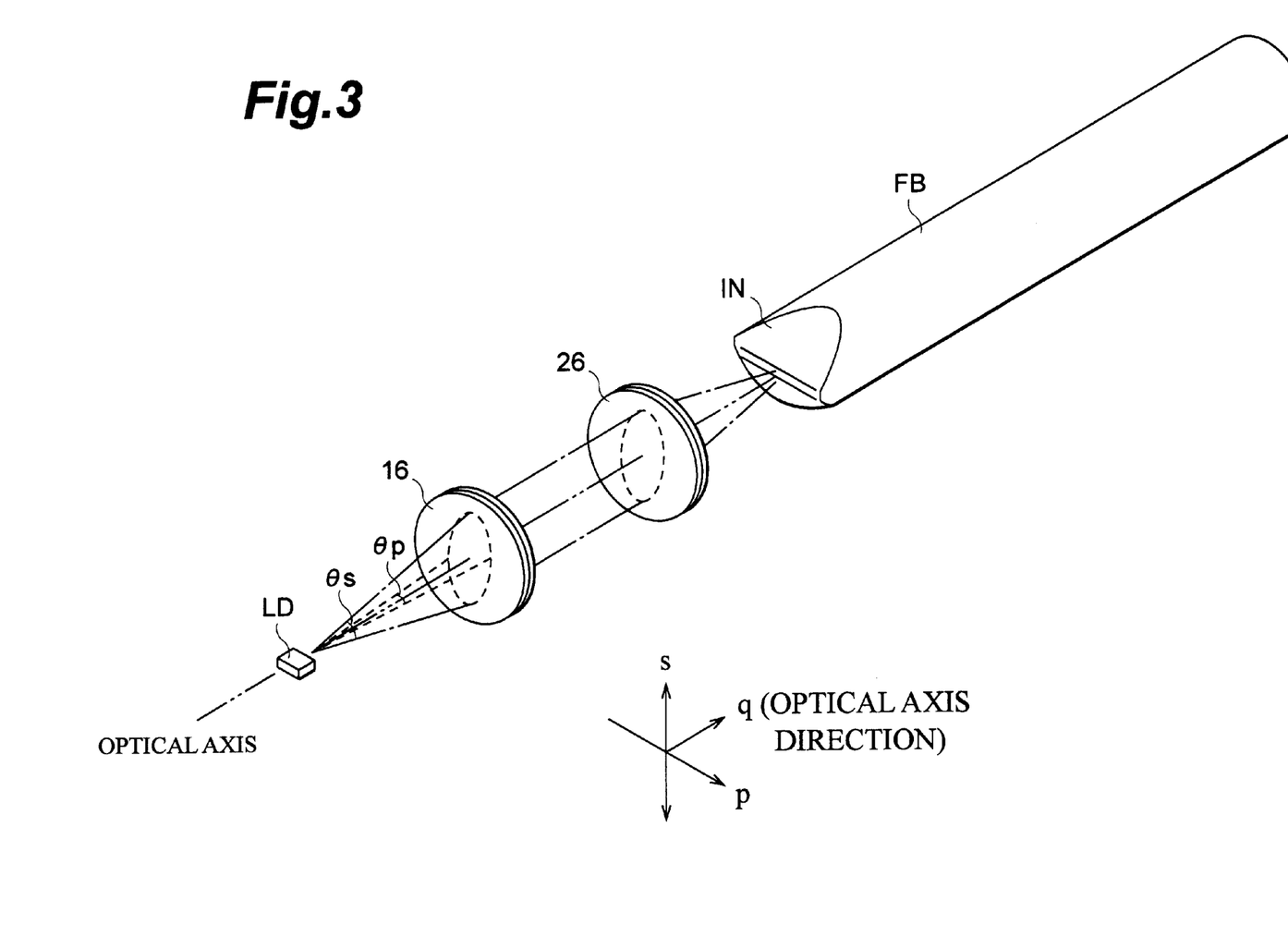
FIG. 3 is an explanatory view schematically showing a configuration of main parts shown in FIG. 2A and FIG. 2B.

As schematically shown in FIG. 3, the incident face IN of the optical fiber FB is processed into a convex surface centered about the core, i.e., into a lens form. The cross section of the convex surface along the optical axis is in an arc form along only one direction (vertical direction s in the drawing) while, in the direction perpendicular thereto (horizontal direction p in the drawing), it is at right angles to the optical axis direction q.

In the assembling process, with the ferrule 28 inserted into the sleeve 20*b*, so-called power monitor technique or the like is used to adjust the angle of rotation in the circumferential direction to maximize the power of the light incident on the optical fiber FB when the light-emitting device LD actually emits light, thereby the direction of a large divergent angle in the light emitted from the light-emitting device LD and the direction in which the convex surface in the incident face (vertical direction s) is made coincide with each other. For convenience, FIG. 3 shows the circumferential direction of the incident face IN of the optical fiber FB with respect to elliptical emitted light whose divergent angle $\theta_s$ in the vertical direction s is greater than the divergent angle $\theta_p$ in the horizontal direction p. This optical module, as with that of the first embodiment, comprises the semiconductor light-emitting device LD having a near-field pattern elongated along a transverse direction, and an optical fiber FB for converging the light distribution along a longitudinal direction more than that along the transverse direction. Preferably, the semiconductor light-emitting device LD is a semiconductor laser. The emitted light having a transversely elongated near-field pattern yields a longitudinally elongated far-field pattern. Since the optical fiber FB converges the light intensity pattern along the longitudinal direction more than that along the transverse direction, the light incident on the optical fiber can be converged into its core at a high coupling efficiency.

In the following, operations of the optical module having such a configuration will be explained. Light emitted from the light exit face of the light-emitting device LD with a divergent angle is shaped by the collimator lens 16 into a substantially parallel light, which passes through the transparent thin plate 24 and is converged by the condenser lens 26 to be couple to the incident face IN of the optical fiber FB. Since the elliptical emitted light enters into the optical fiber FB as being turned into a circular form by the convex surface of the incident face IN thereof, coupling efficiency improves.

On the other hand, in the assembling process, when any of the light-emitting device LD, collimator lens 16, condenser lens 26, and incident face IN of the optical fiber FB positionally shifts in the direction yielding a large divergent angle in the emitted light (vertical direction s in FIG. 3), the emitted light is also shaped by the collimator lens 16 into a light substantially parallel to the normal optical axis q, and further is converged by the condenser lens 26 to couple to the incident face IN of the optical fiber FB.

Namely, even when the light-emitting device LD positionally shifts, the light emitted with an divergent angle is shaped by the collimator lens 16 into substantially a parallel light, whereby the position where the light converged by the condenser lens 26 is incident shifts far less than the light-emitting device LD positionally shifts. Also, in the case where one of the collimator lens 16, condenser lens 26, and optical fiber FB positionally shifts, the position where the light converged by the condenser lens 26 is coupled to the incident face IN shifts very little. Here, the position of the light incident face IN of the optical fiber IN deviates from the focal position of the condenser lens 26.

Accordingly, even when the light exit face of the light-emitting device LD and the collimator lens 16 or the like positionally deviate from each other, as the light emitted with an divergent angle is shaped by the collimator lens 16 into substantially a parallel light, its area of incidence on the condenser lens 26 can be held substantially constant, and the position where the light converged by the condenser lens 26 is coupled to the incident face IN of the optical fiber FB can be greatly restrained from fluctuating. Also, since the emitted light having an elliptical emission pattern is corrected to a circular form before entering the inside thereof, mismatching in mode diameter is suppressed, thereby improving coupling efficiency.

Thus, the optical module in accordance with this embodiment has such a coupling structure that, even when positional deviation occurs in any of the light-emitting device LD, the optical fiber FB, and the collimator lens 16 and condenser lens 26 disposed therebetween, the position where the light is coupled to the incident face IN of the optical fiber FB can be greatly restrained from shifting. Accordingly, the assembling precision in each of these optical parts can be greatly alleviated, while the optical coupling efficiency can be improved simultaneously.

According to actual experimental results employing a typical optical fiber FB with a cladding diameter of 125 $\mu$m and a light-emitting device LD with an emission wavelength of 0.98 $\mu$m, even when the light exit face of the edge-emission type semiconductor laser LD, the collimator lens 16, the condenser lens 26, and the core center of the optical fiber FB axially deviated from each other within the range of $\pm 1$ $\mu$m, an optical coupling efficiency of about 70% or higher was obtained, whereby the excellence of this coupling structure was experimentally confirmed as well.

Figure 4:
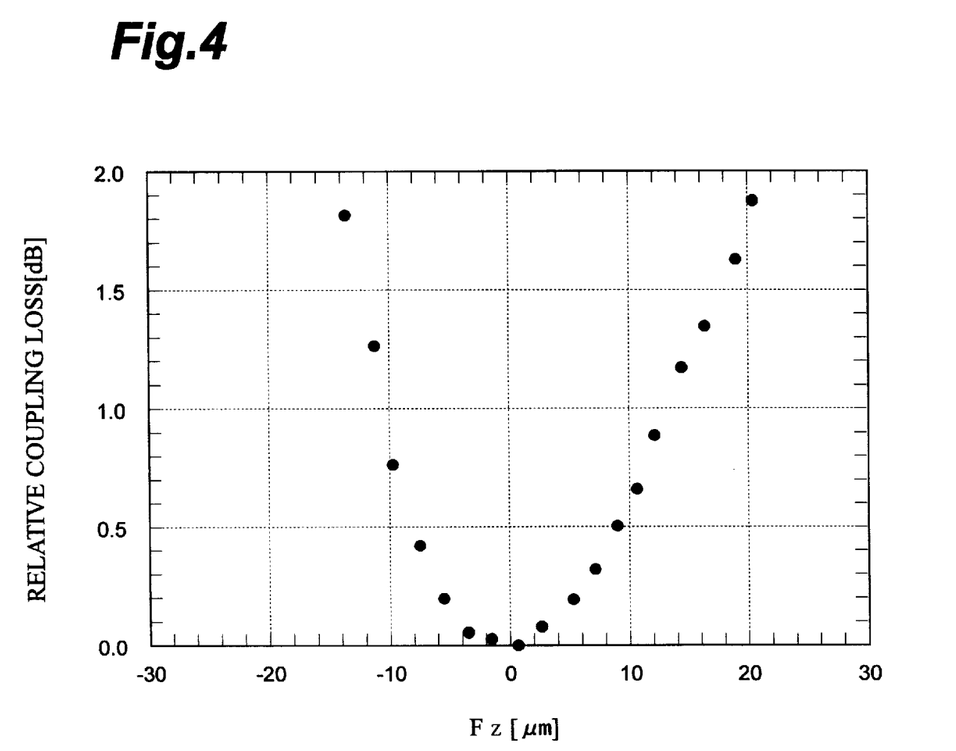
FIG. 4 is a graph showing a relationship of relative coupling loss (dB) with deviation ($\mu$m) in the axial direction (longitudinal direction of fiber FB).

FIG. 4 is a graph showing a relationship of relative coupling loss (dB) with deviation ($\mu$m) in the axial direction (longitudinal direction of the fiber FB). Here, the direction from the condenser lens 26 to the optical fiber FB is referred to as positive. The coupling loss increases about 1 dB as the position moves away from a reference position (point at 0 $\mu$m) by 12 $\mu$m. The focal position of the condenser lens 26 is located at about $-20$ $\mu$m in the graph. As shown in this graph, when axial deviations occur within the ranges of $\pm 10$ $\mu$m and $\pm 5$ $\mu$m, relative coupling losses are not greater than 0.8 dB and 0.3 dB, respectively. Namely, even in the cases where axial deviations occur within the ranges of 20 $\mu$m$\pm 10$ $\mu$m and 20 $\mu$m$\pm 5$ $\mu$m from the focal position of the condenser lens 26, the relative coupling loss can be made not greater than 0.8 dB and 0.3 dB, respectively.

Also, since the coupling efficiency is not influenced by the distance between the collimator lens 16 and the condenser lens 26, an automatic assembling process can be facilitated when their distance is increased, for example. When various kinds of optical parts are disposed between these lenses 16 and 26, the degree of freedom in designing can be greatly enhanced, so as to allow an optical module having a variety of functions to be formed easily, for example.

Further, since the emitted light having a divergent angle is shaped by the collimator lens 16 into a parallel light, the radiation pattern of the light incident on the incident face IN of the optical fiber FB would not become too large.

Accordingly, mismatching in mode diameter can be suppressed without reducing the radius of curvature of the convex surface of the incident face IN. Consequently, it is unnecessary for the incident face IN to be processed sharply, thus facilitating its processing. Also, when the incident face IN is not sharp, its mechanical strength becomes so high that it is possible to prevent such accidents as damages to its tip portion upon abutting to other optical parts. In the above-mentioned experiment, an optical coupling efficiency of about 70% or higher was obtained even when the curvature of the incident face IN was set to a relatively large radius of curvature within the range of 8 to 15 $\mu$m.

When, in order to form a module by mounting the above-mentioned optical parts, coupling portions of the individual optical parts, lens holder 14, 20, and sleeve 20b, ferrule 28, and the like are firmly attached to each other by YAG welding or the like, slight positional deviation may occur between the optical parts upon this YAG welding step. Since tolerance is large, however, this embodiment is also effective in facilitating mass production by using YAG welding.

Though this embodiment relates to a case where the incident face IN of the optical fiber FB is formed into a convex surface having a specific curvature, the present invention should not be restricted thereto. Namely, it may be made into a form having a refractive index distribution such that the emission pattern of the light emitted from the light-emitting device is corrected to a cylindrical shape and then enters into the optical fiber, e.g., an aspherical lens form or a polygonal entrance face form which is set to a plurality of incident angles. Also, the condenser lens 26 may be made as an aspherical lens, thereby ameliorating astigmatism generated by the collimator lens 16.

Though this embodiment relates to a configuration comprising the collimator lens 16 and the condenser lens 26, in the present invention, the collimator lens 16 may be disposed only when necessary, as long as there is at least one piece of lens for converging the light emitted from the light-emitting device LD to couple to the light incident face IN of the optical fiber FB.

Figures 5, 6:
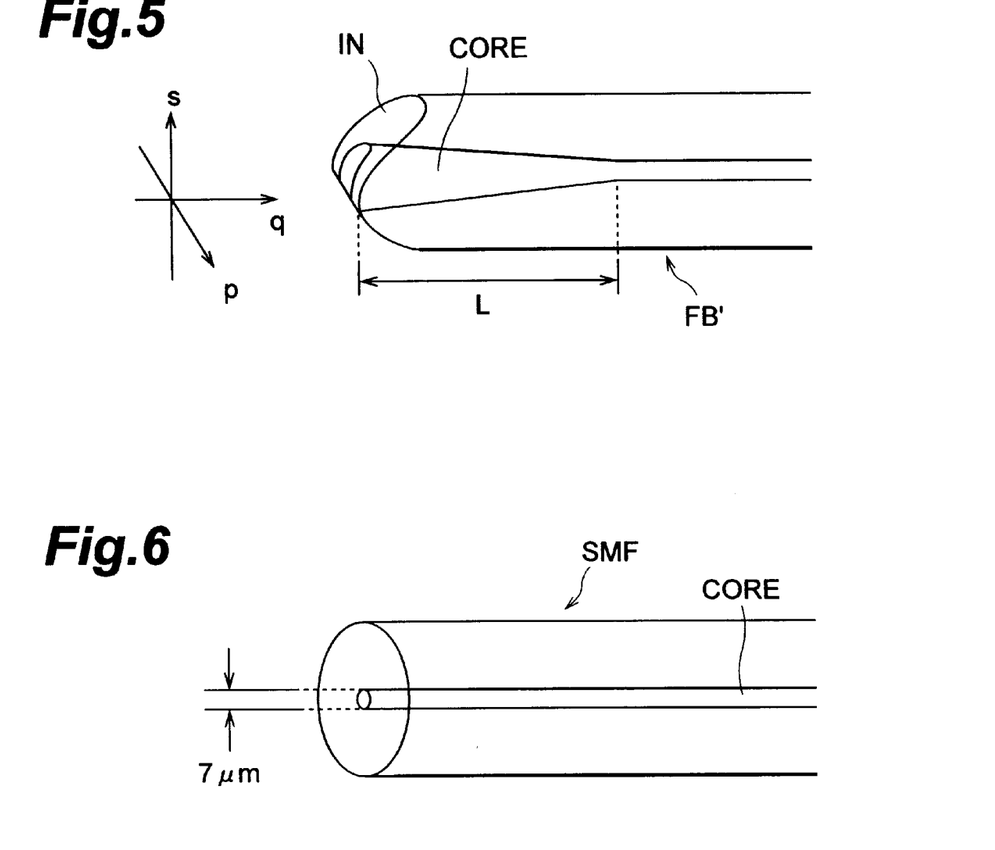
FIG. 5 is a perspective view of an optical fiber FB' whose core is thickened.
FIG. 6 is a perspective view of a single-mode optical fiber FB.

Optical fiber FB' shown in FIG. 5 may be applicable to the optical module instead of the optical fiber FB. FIG. 5 shows optical fiber FB' having a core CORE, the diameter of core CORE being larger near the light incident face IN. That is, in optical fiber FB', the diameter of core CORE extending through optical fiber FB' is larger at the light incident face IN and decreases to a minumun value over dustance L in the longitudinal direction of optical fiber FB'. As a result, optical fiber FB' shows improved optical coupling efficiency and tolerance. The mode-field diameter (MFD) of the core-diameter-expanded region having and defined by length L is adjusted so that the incident light whose sectional shape perpendicular to the optical axis is corrected to a circle by transmitting light incident face IN matches core-diameter-expanded region L.

In the optical system, the axial deviation tolerance $\Delta y$ along the s axis is almost proportional to the magnification m of the lens system 16, 26. That is, $\Delta y = k \times m$ (k is a constant).

In more detail, the axial deviation tolerances $\Delta x$, $\Delta y$ along p axis and s axis satisfy the following equation:

$\Delta x = 0.5 \times (\ln 10/10)^{0.5} \times MFD$ $\Delta y = 0.5 \times (\ln 10/10)^{0.5} \times MFD \times (1/\{(\pi MFD^2/4\lambda)^2 \times ((n-1)/R)^2 + 1\}^{0.5})$ Where R is the minimum radius of curvature of the light incident face IN, that is, the radius of curvature of light incident face IN of a vertical section of optical fiber FB', n is the refractive index of core CORE, and $\lambda$ is the wavelength of light to be transmitted.

When the magnification, m, increases, the tolerance $\Delta y$ also increases. However, when the magnification, m, increases, the mode-field diameter, MFD, should be increased in order to match the incident light to the core diameter expanded region, as described above. That is, $m = j \times MFD$ (j is a coefficient). Since the mode-field diameter, MFD, can be increased by making the core diameter of optical fiber FB' larger, tolerance $\Delta y$ can be increased.

Note that lens system 16, 26 has rotation symmetry relationship around the optical axis, and its magnification m is given by, $m = F2/F1 \times G(F1)$. Where, F1 is the focal length of collimator lens 16, F2 is the focal length of condenser lens 26, and G(F1) is a function of F1. Therefore, the magnification, m, can be increased by shortening the focal length F1 of collimator lens 16, or increasing the focal length F2 of condenser lens 26. Further, when the lens system consists of only condenser lens 26, magnification m can be increased by disposing laser diode LD nearer to lens 26. In other words, since function G(F1) does not depend on F2, magnification, m, can be increased by increasing F2, further, the mode-field diameter, MFD, can be increased, and, therefore, tolerances $\Delta x$, $\Delta y$ can be increased.

The optical coupling loss depends on the relationship between mode-field diameter, MFD, and radius of curvature, R, when radius of curvature R is not in a range between 0.5 to 2 times of mode-field diameter, MFD, on light incident face IN, the coupling loss increases greatly. Therefore, the radius of curvature R is preferably in the range between 0.5 to 2 times of mode-field diameter MFD on light incident face IN.

The tolerance $\Delta y$ is 1.1 $\mu$m and the coupling loss is not more than 1 dB, when focal length F1 is 0.74 mm, focal length F2 is 2.5 mm, mode-field diameter, MFD, and radius of curvature R, on light incident face IN are 14 $\mu$m and 20 $\mu$m, a core diameter in a non-core-diameter-expanded region is 7 $\mu$m, and the relative refractive index difference is 0.3%. The assembling loss expected from this tolerance $\Delta y$ is 0.8 dB. Core diameter, CD, is related to mode-field diameter, MFD, so that the core diameter, CD, is greater than mode-field diameter, MFD, when core diameter CD is more than 7 $\mu$m, and core diameter CD is smaller than mode-field diameter MFD when core diameter CD is less than 7 $\mu$m. Therefore, a desired mode-field diameter MFD can be obtained by adjusting core diameter CD.

Figure 7:
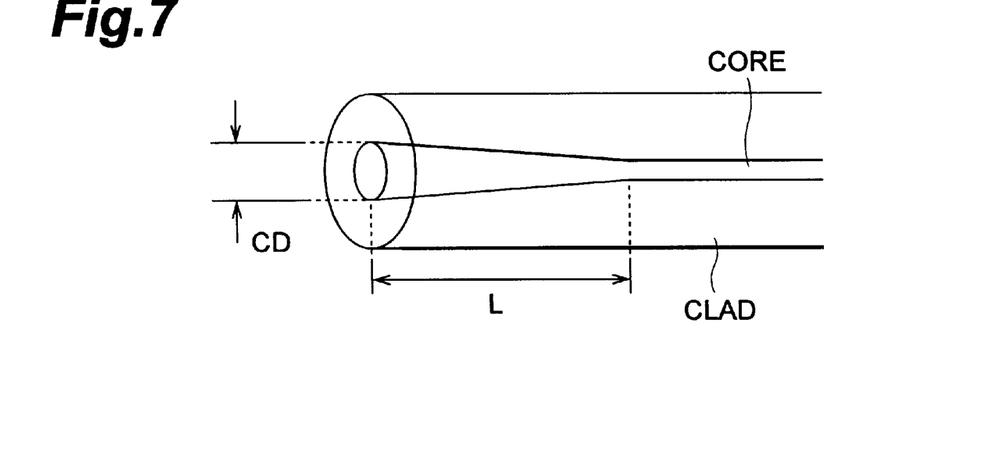
FIG. 7 is an intermediate product of the optical fiber FB'.

Next, a manufacturing method of the core-expanded region L will be explained. First, a single-mode optical fiber SMF with 7 $\mu$m core diameter as shown in FIG. 6 is prepared. And, as shown in FIG. 7, an intermediate product of optical fiber FB' having 10 to 15 $\mu$m core diameter, CD, at end face IN is fabricated by heating a region within 5 mm from the end face of optical fiber, SMF, and causing dopant in core, CORE, to be distributed into cladding CLAD. After that, optical fiber FB' is completed by polishing end face IN of the fiber so that the end face IN has the shape as shown in FIG. 5.

As explained in the foregoing, the optical module comprises a condenser lens, disposed so as to face the light exit face of the light-emitting device, for converging the light emitted from the light exit face; and an optical fiber, having an incident face processed into a lens form for correcting the emission pattern of the emitted light to a circular form, in which the light converged by the condenser lens is coupled to the incident face.

Also, it is configured such that, between the light exit face of the light-emitting device and the condenser lens, a collimator lens for changing the light emitted from the light-emitting device into a parallel light and emitting this light to the condenser lens is provided.

The light emitted from the light-emitting device is converged by the condenser lens to couple to the incident face of the optical fiber. Even when positional deviation occurs between the light exit face of the light-emitting device and the incident face of the optical fiber, as the emitted light is converged by the condenser lens to coupled to the incident face of the optical fiber, the positional deviation is suppressed, while the light is coupled to the incident face of the optical fiber. Since the emitted light with an elliptical emission pattern enters the optical fiber while its elliptical form is corrected to a circular form at the incident face, mismatching in mode diameter is suppressed, thus allowing coupling efficiency to improve.

When the collimator lens is disposed between the light exit face of the light-emitting device and the condenser lens, the light emitted from the light-emitting device with an divergent angle is coupled to the condenser lens after being converted into a parallel light by the collimator lens, thereby homogenizing the position where the light converged by the condenser lens is incident on the incident face of the optical fiber. Namely, the position where the light from the condenser lens is coupled to the incident face of the optical fiber is less likely to be influenced by the positional deviation between the light-emitting device and the incident face of the optical fiber, whereby coupling efficiency improves.

As stated above, the optical module comprises: semiconductor light-emitting device LD having a near-field pattern elongated along a first direction, the first direction being perpendicular to both of the light-emitting direction and thickness the semiconductor light-emitting device LD; and optical fiber FB having a light incident face, the end face converging a light intensity distribution more along a second direction which is perpendicular to both of a longitudinal direction of the optical fiber and the first direction than a light intensity distribution along the first direction, the light incident face opposed to a light exit face of the semiconductor light-emitting device LD.

The optical module further comprises condenser lens facing the light exit face of the semiconductor light-emitting device LD, the condenser lens converging light emitted from the semiconductor light-emitting device onto the light incident face of the optical fiber.

The optical module further comprises collimator lens 16 disposed between the light exit face of the semiconductor light-emitting device LD and the condenser lens 26, the collimator lens 16 changing the light emitted from the semiconductor light-emitting device into a substantially parallel light and emitting the light to the condenser lens. The incident face IN of the optical fiber FB has a lens form for correcting an emission pattern of the emitted light to a circular form.

The incident face IN of the optical fiber FB has a cylindrical surface, the center axis of the cylindrical surface being parallel the first direction and crossing a core of the optical fiber FB.

The incident face IN of the optical fiber FB has a cylindrical surface, the center axis of the cylindrical surface IN being perpendicular to a plane defined by the maximum radiation angle subtended by light from the semiconductor light-emitting device LD.

The incident face IN deviates from a focal position of the condenser lens 26.

Further, since the optical fiber has a core-expanded region and mode-field diameter MFD can be adjusted by using the above core-diameter thickening process described above, coupling losses in different kind of optical fibers will be uniform. Further, the radius of curvature of the projection curved surface IN can be extended by enlarging the core diameter, therefore, projection curved surface IN can be easily processed and can improve the mechanical strength thereof.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising:
    a semiconductor light-emitting device having a near-field pattern elongated along a first direction, the first direction being perpendicular to both a light-emitting direction and a thickness of the semiconductor light-emitting device; and
    an optical fiber having a light incident face, said light incident face converging a light distribution along a second direction, which is perpendicular to both a longitudinal direction of said optical fiber and said first direction, more than a light intensity distribution along said first direction, said light incident face opposed to a light exit face of said semiconductor light-emitting device; and
    a condenser lens disposed facing said light exit face of said semiconductor light-emitting device, said condenser lens converging light emitted from said semiconductor light-emitting device onto said light incident face of said optical fiber.

2. An optical module according to claim 1, wherein said incident face of said optical fiber has a lens form for correcting an emission pattern of said emitted light to a circular form.

3. An optical module according to claim 1, wherein said incident face of said optical fiber has a cylindrical surface.

4. An optical module according to claim 3, wherein the center axis of the cylindrical surface is parallel to said first direction and perpendicular to an optical axis of said optical fiber.

5. An optical module according to claim 3, wherein the center axis of the cylindrical surface is perpendicular to a plane defined by the maximum divergent angle subtended by light from said semiconductor light-emitting device.

6. An optical module according to claim 1, wherein said optical fiber has a core, said core being expanded toward said light incident face.

7. An optical module according to claim 1, further comprising a collimator lens disposed between said light exit face of said semiconductor light-emitting device and said condenser lens, said collimator lens collimating the light emitted from said semiconductor light-emitting device.

8. An optical module according to claim 1, wherein said light incident face deviates from a focal position of said condenser lens.

9. An optical module comprising:
    a semiconductor light-emitting device having a near-field pattern elongated along a first direction, the first direction being perpendicular to both a light-emitting direction and a thickness of the semiconductor light-emitting device;
    an optical fiber having a light incident face, said light incident face converging a light distribution along a second direction, which is perpendicular to both a longitudinal direction of said optical fiber and said first direction, more than a light intensity distribution along said first direction, said light incident face opposed to a light exit face of said semiconductor light-emitting device;

a condenser lens disposed facing said light exit face of said semiconductor light-emitting device, said condenser lens converging light emitted from said semiconductor light-emitting device onto said light incident face of said optical fiber; and a collimator lens disposed between said light exit face of said semiconductor light-emitting device and said condenser lens, said collimator lens collimating the light emitted from said semiconductor light-emitting device.

10. An optical module comprising:

a semiconductor light-emitting device having a near-field pattern elongated along a first direction, the first direction being perpendicular to both a light-emitting direction and a thickness of the semiconductor light-emitting device; and an optical fiber having a light incident face, said light incident face converging a light distribution along a second direction, which is perpendicular to both a longitudinal direction of said optical fiber and said first direction, more than a light intensity distribution along said first direction, said light incident face opposed to a light exit face of said semiconductor light-emitting device, wherein said incident face of said optical fiber has a lens form for correcting an emission pattern of said emitted light to a circular form.

11. An optical module comprising:

a semiconductor light-emitting device having a near-field pattern elongated along a first direction, the first direction being perpendicular to both a light-emitting direction and a thickness of the semiconductor light-emitting device; and an optical fiber having a light incident face, said light incident face converging a light distribution along a second direction, which is perpendicular to both a longitudinal direction of said optical fiber and said first direction, more than a light intensity distribution along said first direction, said light incident face opposed to a light exit face of said semiconductor light-emitting device, wherein said incident face of said optical fiber has a cylindrical surface, the center axis of the cylindrical surface being perpendicular to a plane defined by the maximum divergent angle subtended by light from said semiconductor light-emitting device.

12. An optical module comprising:

a semiconductor light-emitting device having a near-field pattern elongated along a first direction, the first direction being perpendicular to both a light-emitting direction and a thickness of the semiconductor light-emitting device;

an optical fiber having a light incident face, said light incident face converging a light distribution along a second direction, which is perpendicular to both a longitudinal direction of said optical fiber and said first direction, more than a light intensity distribution along said first direction, said light incident face opposed to a light exit face of said semiconductor light-emitting device; and a condenser lens disposed facing said light exit face of said semiconductor light-emitting device, said condenser lens converging light emitted from said semiconductor light-emitting device onto said light incident face of said optical fiber, first direction, said light incident face opposed to a light exit face of said semiconductor light-emitting device;

wherein said light incident face deviates from a focal position of said condenser lens.

13. An optical module comprising:

a semiconductor light-emitting device having a near-field pattern elongated along a first direction, the first direction being perpendicular to both a light-emitting direction and a thickness of the semiconductor light-emitting device; and an optical fiber having a light incident face, said light incident face converging a light distribution along a second direction, which is perpendicular to both of a longitudinal direction of said optical fiber and said first direction, more than a light intensity distribution along said first direction, said light incident face opposed to a light exit face of said semiconductor light-emitting device, wherein said optical fiber has a core, said core being expanded toward said light incident face.

* * * * *